US011035821B2

(12) United States Patent
Toudou et al.

(10) Patent No.: US 11,035,821 B2
(45) Date of Patent: Jun. 15, 2021

(54) GAS CONCENTRATION DETECTION APPARATUS

(71) Applicant: DENSO CORPORATION, Kariya (JP)

(72) Inventors: Yuusuke Toudou, Kariya (JP); Takehito Kimata, Kariya (JP); Yuusuke Kawamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 15/515,262

(22) PCT Filed: Oct. 1, 2015

(86) PCT No.: PCT/JP2015/077967
§ 371 (c)(1),
(2) Date: Mar. 29, 2017

(87) PCT Pub. No.: WO2016/052707
PCT Pub. Date: Apr. 7, 2016

(65) Prior Publication Data

US 2017/0219516 A1 Aug. 3, 2017

(30) Foreign Application Priority Data

Oct. 1, 2014 (JP) ............................ JP2014-203160
Sep. 3, 2015 (JP) ............................ JP2015-173919

(51) Int. Cl.
*G01N 27/407* (2006.01)
*G01N 27/41* (2006.01)
(Continued)

(52) U.S. Cl.
CPC ..... *G01N 27/4074* (2013.01); *G01N 27/4067* (2013.01); *G01N 27/4075* (2013.01); *G01N 27/41* (2013.01); *G01N 27/419* (2013.01)

(58) Field of Classification Search
CPC .......... G01N 27/4074; G01N 27/4075; G01N 27/41; G01N 27/419; G01N 27/4067
See application file for complete search history.

(56) References Cited

U.S. PATENT DOCUMENTS 5,397,442 A 3/1995 Wachsman
6,551,497 B1 4/2003 Gao et al.
(Continued)

FOREIGN PATENT DOCUMENTS

JP 2001-141696 5/2001
JP 2001141696 A * 5/2001
(Continued)

OTHER PUBLICATIONS

English translation of International Search Report for Application No. PCT/JP2015/077967 dated Nov. 10, 2015 (2 pages).

*Primary Examiner* — James Lin
*Assistant Examiner* — Vivian A Tran
(74) *Attorney, Agent, or Firm* — Nixon & Vanderhye PC

(57) ABSTRACT

A gas concentration detection apparatus is provided with a measuring gas chamber, a solid electrolyte body, a pump cell, a sensor cell, a pump cell controller and a sensor cell detection section. The pump cell controller applies an elimination voltage to the pump cell at a start-up point, before a gas concentration is detected. The water in the measuring gas chamber is decomposed and hydrogen is generated by application of the elimination voltage. Oxygen occluded in a sensor electrode of the sensor cell is removed by the hydrogen.

27 Claims, 13 Drawing Sheets

(51) Int. Cl.

| | |
|---|---|
| ***G01N 27/419*** | (2006.01) |
| ***G01N 27/406*** | (2006.01) |

(56) References Cited

U.S. PATENT DOCUMENTS

| | | | | |
|---|---|---|---|---|
| 2002/0050455 | A1* | 5/2002 | Kurokawa ......... | G01N 27/4175 204/431 |
| 2002/0195338 | A1 | 12/2002 | Mizutani et al. | |
| 2004/0050695 | A1* | 3/2004 | Haraguchi ........... | G01N 27/419 204/424 |
| 2004/0074773 | A1 | 4/2004 | Niwa | |
| 2004/0138825 | A1* | 7/2004 | Kawase ............... | G01N 27/419 702/24 |
| 2004/0159547 | A1* | 8/2004 | Haraguchi ......... | G01N 33/0037 204/424 |
| 2004/0188250 | A1* | 9/2004 | Sakai ................. | G01N 33/0037 204/412 |
| 2013/0092537 | A1 | 4/2013 | Mizutani et al. | |
| 2013/0255352 | A1* | 10/2013 | Ohtsubo ................ | G01R 35/00 73/1.06 |
| 2015/0034484 | A1* | 2/2015 | Nakasone .......... | G01N 27/4162 204/412 |

FOREIGN PATENT DOCUMENTS

| | | | |
|---|---|---|---|
| JP | 2002-156350 | | 5/2002 |
| JP | 2003149199 A | * | 5/2003 |
| JP | 2009-150741 | | 7/2009 |
| JP | 2011-058834 | | 3/2011 |
| WO | WO 2015/115660 | | 8/2015 |
| WO | WO 2016/121380 | | 8/2016 |

* cited by examiner

1
III
201
202
A
33
42
2Y
25
22
51
5
II
2
52
101
41
2X
21
102
31
32
331
G
34
L
V1
61
A 1
2
A
101
$O_2$
$H_2$
$H_2O$
25
2Y
22
42
102
25
2X
21
41
L
G
A
V2
61

1
12
A
102
33
5
2
31
52
22
51
21
25
101
11
32
G 1
201
202
A
33
42
22 2Y 25
101
101A 101B
41
21A 2X 21B
32
G
51
5
102
332
52
2A
2
34
L
A
61

GAS CONCENTRATION DETECTION APPARATUS

CROSS REFERENCE TO RELATED APPLICATION

The application is the U.S. national phase of International Application No. PCT/JP2015/077967 filed Oct. 1, 2015 which designated the U.S. and claims priority to Japanese Patent Application No. 2014-203160, filed on Oct. 1, 2014, and Japanese Patent Application No. 2015-173919 filed on Sep. 3, 2015, entire contents of each of which are incorporated herein by reference.

TECHNICAL FIELD

The present disclosure relates to a gas concentration detection apparatus, for detection of a concentration of a specific gas in a measuring gas.

RELATED ART

In gas concentration detection apparatuses (gas sensors), it is desirable to a heat solid electrolyte body and an electrode at a predefined activation temperature promptly, and provide the gas sensor in a usable state. Additionally, at a start-up point of the sensor of the gas concentration detection apparatus before a gas concentration is measured, since an oxygen concentration is high in a space in which a measuring gas is introduced, it is desirable for the oxygen concentration to be below a predetermined concentration, at an earliest possible time.

Incidentally, if materials containing platinum and rhodium are used for a sensor electrode detecting NOx as a specific gas, it is known that rhodium can store oxygen especially when the gas concentration detection apparatus is not being used.

For example, a gas detection apparatus in the patent literature 1, discloses that if a Rh (Rhodium) or a Pt—Rh (Platinum-Rhodium) electrode with a high NOx decomposing efficiency is provided as a detection electrode of a sensor cell, a second control voltage having a higher decomposing efficiency than a typical first control voltage applied to the sensor cell decomposes oxygen adsorbed on the detection electrode, at a start-up point of the sensor cell, within predefined time. As a result, a time necessary to stabilize a current of the sensor cell detecting NOx concentration is shortened.

CITATION LIST

Patent Literature

[Patent Literature 1] JP-A publication No. 2001-141696.

However, the gas detection apparatus disclosed in patent literature 1 decomposes the oxygen occluded in the detection electrode of the sensor cell by increasing the voltage applied to the sensor cell. More specifically, the gas detection apparatus according to the patent literature 1 employs a same principle of decomposing oxygen in a measuring gas which has contact with the detection electrode. The principle is one in which the oxygen occluded in the detection electrode is forcibly decomposed. As a consequence, a time necessary to decompose the oxygen occluded in the detection electrode tends to increase, and is insufficient for further enhancing early activation of the gas detection apparatus.

SUMMARY OF INVENTION

In view of the foregoing, the present disclosure aims to provide a gas concentration detection apparatus which can rapidly remove oxygen occluded from a sensor electrode, and achieve early activation of the gas concentration detection apparatus.

Solution to the Problem

A mode of the present disclosure is a gas concentration detection apparatus provided with a measuring gas chamber into which a measuring gas is introduced, a pump cell having a solid electrolyte having oxygen ion conductivity and a pair of electrodes provided on the solid electrolytes, a sensor cell having a solid electrolyte provided with oxygen ion conductivity and a pair of electrodes disposed on the solid electrolyte, a pump cell controller adjusting an oxygen concentration in the measuring gas of the measuring gas chamber, by applying voltage to the pump cell, and a sensor cell detecting a specific gas in the measuring gas of the measuring gas chamber after the oxygen concentration is adjusted by the pump cell.

The pump cell controller applies an elimination voltage to the pump cell to change an output current of the sensor cell from a positive side to a negative side, at a start-up point before detecting the gas concentration to remove oxygen occluded in the sensor electrode disposed in the measuring gas chamber, the sensor electrode being among the pair of electrodes of the sensor cell, whereby substances in the measuring gas chamber are decomposed to generate a reduced gas.

Effect of Invention

The gas concentration detection apparatus is provided with a pump controller to apply the elimination voltage to the pump cell. The pump cell controller generates the reduced gas in the measuring gas chamber at the start-up period, which is referred to as a start-up point hereon, of the sensor of the gas concentration detection apparatus. That is, before detecting the gas concentration, the pump controller applies the elimination voltage to the pump cell whereby substances in the measuring gas chamber are decomposed and the reduced gas is generated. The reduced gas can thus be generated by decomposing substances contained in the measuring gas in the measuring gas chamber.

Subsequently, the reduced gas generated in the measuring gas chamber spreads inside the measuring gas chamber and flows to the sensor electrode of the sensor cell. As a result, the reduced gas reacts with the oxygen occluded inside the sensor electrode, and the oxygen itself is removed from the sensor electrode. In the gas concentration detection apparatus described hereinabove, a method of supplying the reduced gas to the sensor electrode is employed, for reduction of the oxygen occluded in the sensor electrode, at the start-up period before the detection of the gas concentration is performed. As a consequence is the oxygen reduction reaction can remove the oxygen occluded in the sensor electrode.

Furthermore, the oxygen occluded in the sensor electrode can be rapidly removed, and early activation of the gas concentration detection apparatus can be achieved.

DESCRIPTION OF EMBODIMENTS

Figure 1:
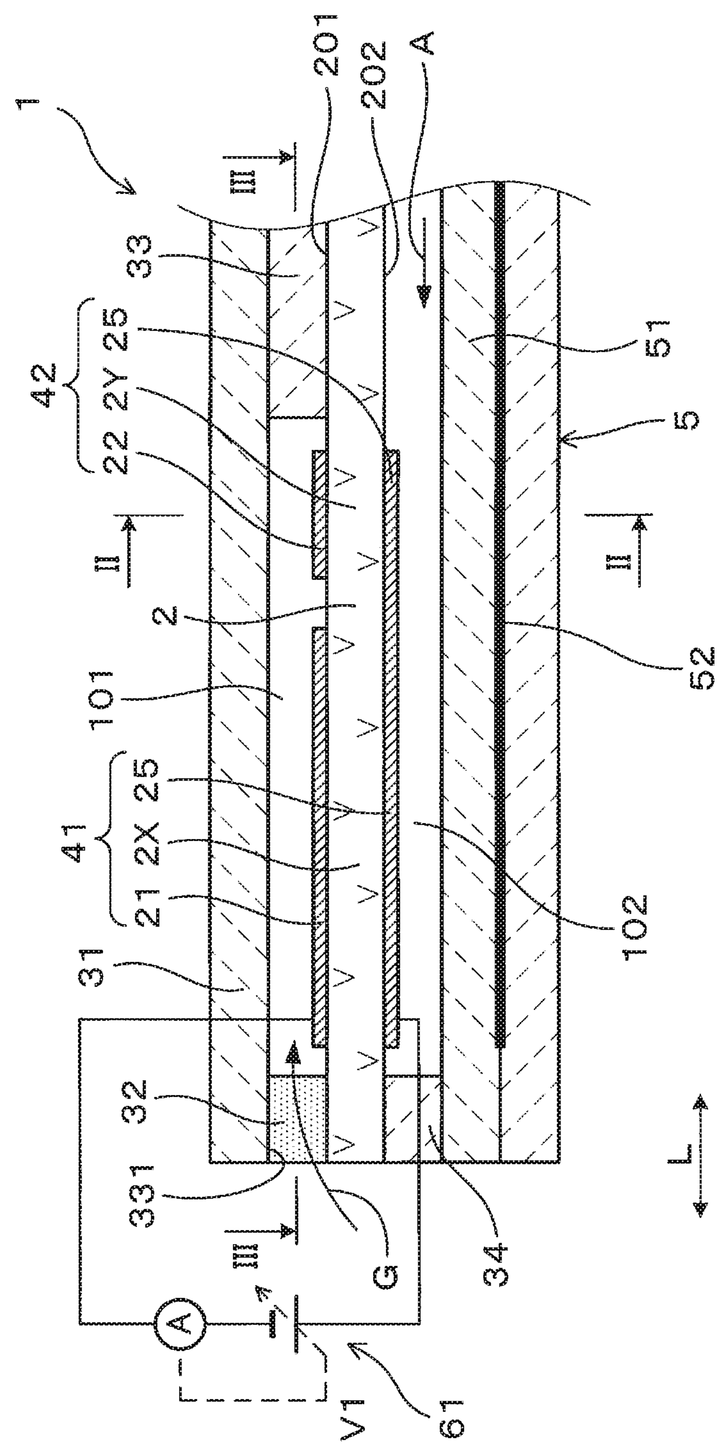
FIG. 1 is a descriptive diagram showing a cross section of a sensor element of a gas concentration detection apparatus according to a first embodiment.

A preferred embodiment of a gas concentration detection apparatus will now described.

At a start-up point of the gas concentration detection apparatus, an elimination voltage applied to a pump cell by a pump cell controller may be applied only once. The elimination voltage may also be repeatedly applied in a plurality of times. The pump cell controller may apply a single or the plurality of elimination voltages of a same current value. When the elimination voltage is applied once, a voltage value of the elimination voltage may be changed during the application thereof. Additionally, when applying the plurality of elimination voltages, the elimination voltage may be changed on each application thereof.

A reduced gas is hydrogen generated when water in a measuring gas is decomposed by the pump cell controller.

The measuring gas is an exhaust gas, for example, from an internal combustion engine, which contains water in an atmosphere, for example. The water in the measuring gas can thus be decomposed to hydrogen and oxygen, by applying the elimination voltage to the pump cell from the pump cell controller. In addition, since the hydrogen reacts with the oxygen occluded in the sensor electrode to produce water, the oxygen occluded in the sensor electrode can be eliminated.

The sensor electrode contains platinum and rhodium, and the pump cell controller may be configured to eliminate oxygen occluded in the rhodium of the sensor electrode using the reduced gas.

The rhodium used in the sensor electrode has a high decomposition efficiency of NOx (nitrogen oxides) as a specific gas contained in the measuring gas, but on the other hand rhodium also has a property of storing oxygen. The platinum used for the sensor electrode, for example, is superior in close adhesion with the solid electrolyte and thermal-resistance.

By configuring the sensor electrode from a material which contains platinum and rhodium, close adhesion of the sensor electrode with the solid electrolyte body and superior thermal resistance can be achieved, and also a gas concentration detection apparatus provided with high detection precision to detect a NOx concentration as the specific gas can be formed.

Other than forming the sensor electrode from platinum (Pt) combined with rhodium (Rh), the sensor electrode may also be formed from platinum combined with, palladium (Pd), iron (Fe), cobalt (Co) or nickel (Ni), for example. In a case of combining platinum (Pt) with palladium, iron, cobalt or nickel a decomposition efficiency of NOx can be still provided to the sensor electrode.

Even when palladium, iron, cobalt or nickel is contained in the sensor electrode, it is considered that the oxygen occluded in these substances can be eliminated by the reduced gas generated by the pump cell controller.

First Embodiment

An embodiment of a gas concentration detection apparatus will be described with reference to the figures.

The gas concentration detection apparatus according to the first embodiment is equipped with a measuring gas chamber 101, a solid electrolyte body 2 having oxygen ion conductivity, a pump cell 41, a sensor cell 42, a pump cell controller 61 and a sensor cell detection section 62. The measuring gas chamber 101 is a space where a measuring gas is introduced. The pump cell 41 is configured of a solid electrolyte 2X as a part of the solid electrolyte body 2, and a pair of electrodes 21 and 25 provided on both respective surfaces of the solid electrolyte 2X. The sensor cell 42 is configured of a solid electrolyte 2Y as a part of the solid electrolyte body 2 and a pair of electrodes 22 and 25 provided on both surfaces of the solid electrolyte 2Y. One of electrodes among the pair of electrodes 22 and 25 is configured as an electrode which is exposed to the measuring gas chamber 101.

The pump cell controller 61 adjusts an oxygen concentration in the measuring gas G of the measuring gas chamber 101 by applying a voltage to the pair of electrodes 21 and 25 of the pump cell 41. The sensor cell detection section 62 detects a concentration of a specific gas in the measuring gas G of the measuring gas chamber 101, after the voltage is applied to the pair of electrodes 22 and 25 of the sensor cell 42 and the oxygen concentration is adjusted by the pump cell 41.

Figure 4:
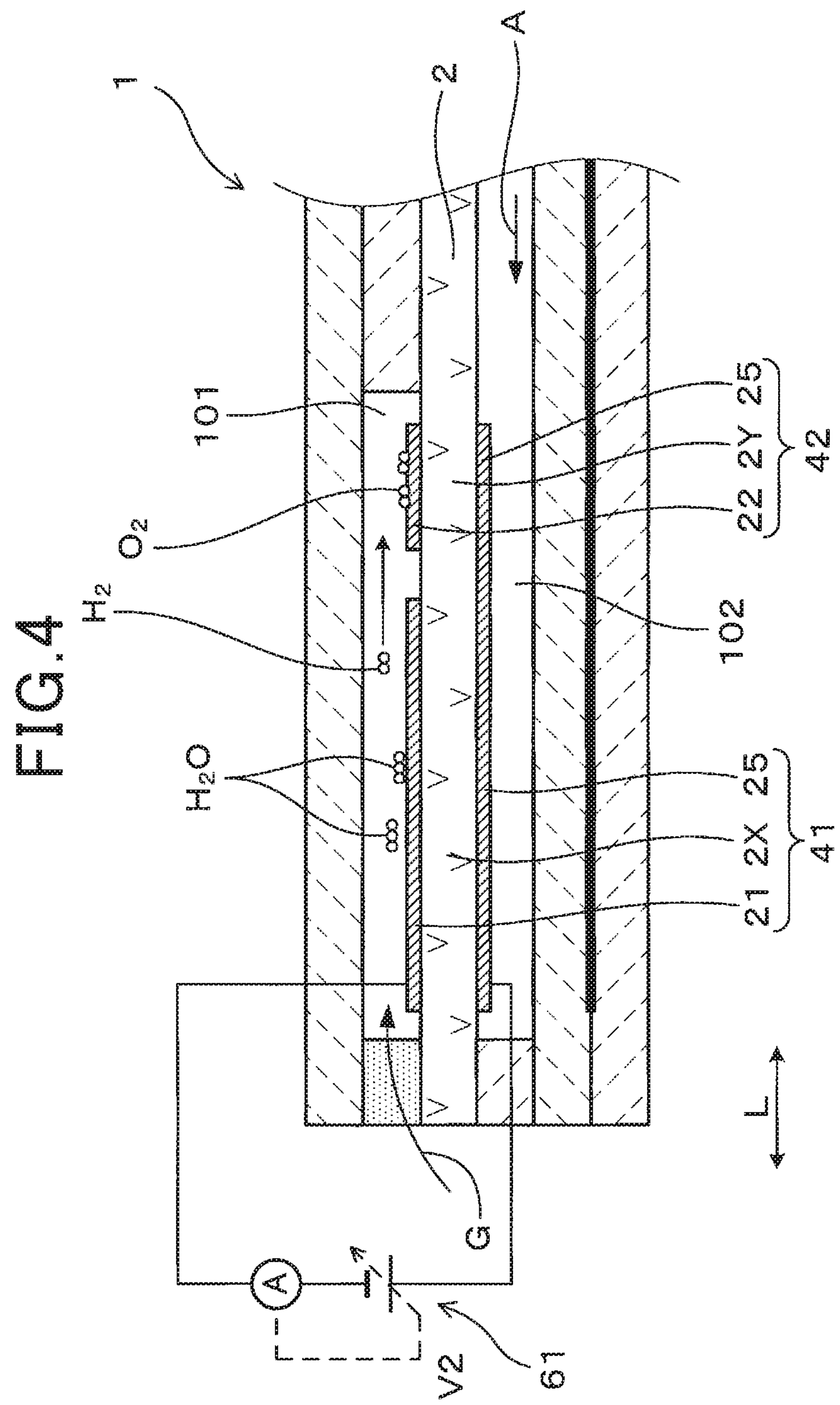
FIG. 4 is a diagram showing a cross section of the sensor element of the gas concentration detection apparatus descriptively showing a state of applying an elimination voltage to the pump cell at a start-up point of a sensor of the gas concentration detection apparatus according to the first embodiment.

The pump cell controller 61 is configured to apply an elimination voltage V2 to the pump cell 41 at a start-up point of a sensor, before detection of the gas concentration is performed, as shown in FIG. 4. In the gas concentration detection apparatus described herein, water ($H_2O$) in the measuring gas chamber 101 is decomposed to generate hydrogen ($H_2$), and oxygen ($O_2$) occluded in the sensor electrode 22 which is exposed in the measuring gas chamber 101, among the pair of electrodes 22 and 25 of the sensor cell 42, is removed by hydrogen ($H_2$).

Hereinafter, the gas concentration detection apparatus according to the first embodiment is described with reference to FIG. 1 to FIG. 7.

The gas concentration detection apparatus according to the embodiment is disposed in an exhaust pipe where an exhaust gas of an internal combustion engine flows. The measuring gas G is the exhaust gas flowing in the exhaust pipe, and the gas concentration detection apparatus detects NOx (nitrogen oxide) as the specific gas in the exhaust gas.

Figure 2:
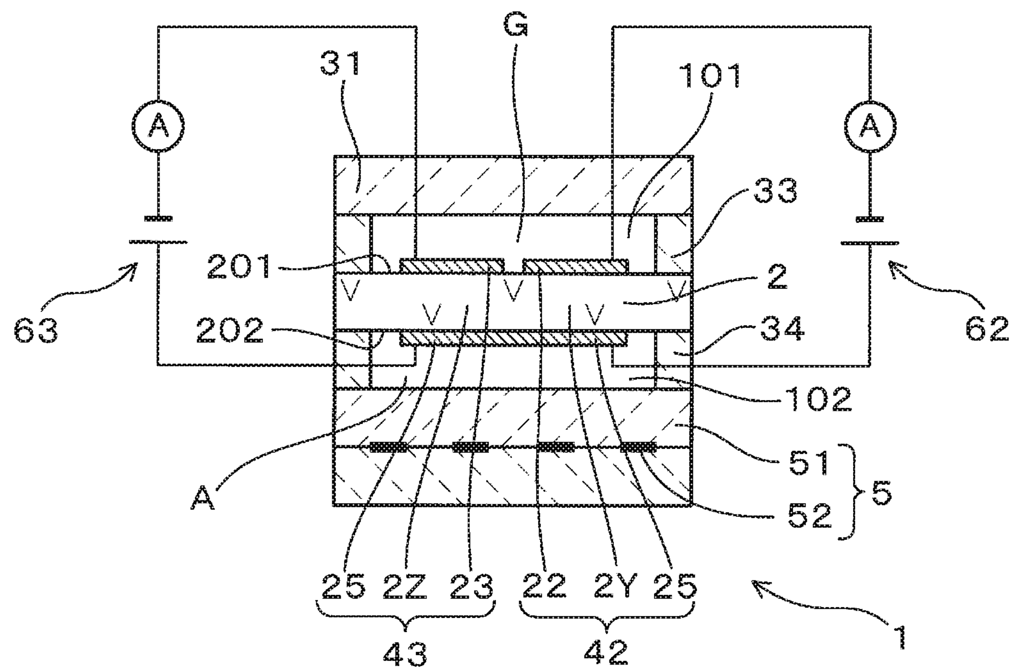
FIG. 2 is a descriptive diagram showing a cross section across a line II-II in FIG. 1, illustrating a sensor element of the gas concentration detection apparatus according to the first embodiment.
Figure 3:
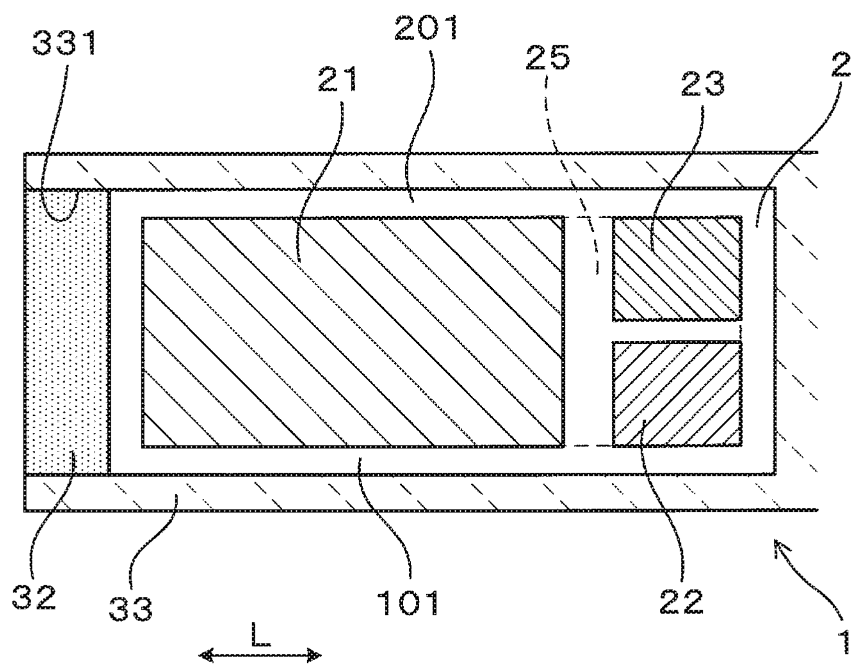
FIG. 3 is a descriptive diagram showing a cross section across a line III-III in FIG. 1, illustrating the sensor element of the gas concentration detection apparatus according to the first embodiment.
Figure 5:
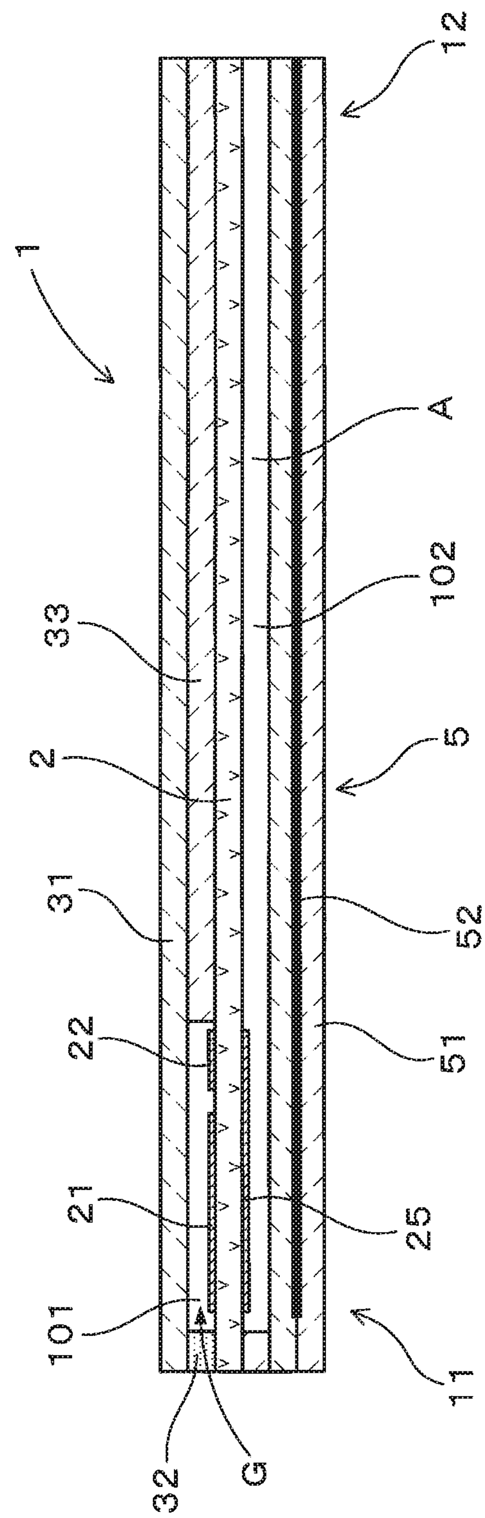
FIG. 5 is a descriptive diagram showing a cross section of an entire sensor element of the gas concentration detection apparatus according to the first embodiment.

As shown in FIG. 1, FIG. 2 and FIG. 5, a sensor element 1 is provided with the solid electrolyte body 2 for example, of zirconia, and a heater 5 for heating the solid electrolyte body 2. The sensor 1 is configured of, for example, the measuring gas chamber 101, the pump cell 41 and the sensor cell 42. The sensor 1 is disposed in a housing 72 configuring a gas sensor.

On a surface 201 of the solid electrolyte body 2, an insulating body 31 is laminated via a first spacer 33, and the measuring gas chamber 101 is formed surrounded by the insulating body 31 and the first spacer 33. Additionally, on a second surface 202 of the solid electrolyte body 2, the heater 5 is laminated via a second spacer 34, and a reference gas chamber 102 is formed surrounded by the heater 5 and the second spacer 34. An introduction port 331 of the measuring gas G is formed on a front end section of the first spacer 33, and a diffusion resistance body 32 formed from a porous body is embedded in the introduction port 331. The measuring gas G passed through the diffusion resistance body 32 is introduced into the measuring gas chamber 101. The measuring gas G can be introduced into the measuring gas chamber 101 under a predefined diffusion resistance by the diffusion resistance body 32. The heater 5 is provided with a conduction layer 52 between the ceramic plate layers 51, which is electrically heated.

As shown in FIG. 2, other than the pump cell 41 and the sensor cell 42, a monitor cell 43 is provided in the sensor element 1. The monitor cell 43 is configured by a solid electrolyte 2Z as a part of the solid electrolyte body 2, and a pair of electrodes 23 and 25 provided on both respective surfaces of the solid electrolyte 2Z. The gas concentration detection apparatus is provided with a monitor cell detection section 63 which detects a concentration of residual oxygen in the measuring gas G of the measuring gas chamber 101, after the oxygen concentration is adjusted by the pump cell 41. The gas concentration detection apparatus is also provided with a calculation section 661 which calculates the concentration of the specific gas in the measuring gas G by subtracting an output of the monitor cell detection section 63 from an output of the sensor cell detection section 62 (refer to FIG. 9 described in detail hereinafter).

The gas sensor detection apparatus is also provided with a gas sensor 10 which includes the sensor element 1 and a control computer connected to the gas sensor 10. The control computer is configured to operate the pump cell controller 61 and the heater controller 5, and also to detect a sensor signal of the sensor cell detection section 62 and a sensor signal (monitor signal) of the monitor cell detection section 63. The control computer collates the sensor signal of the sensor cell detection section 62 and the sensor signal of the monitor cell detection section 63 and calculates the concentration of the specific gas in the measuring gas G by the calculation section 661. More specifically, the concentration of the specific gas (NOx) in the measuring gas G is detected by subtracting a current flowing to the monitor cell, from a current flowing to the sensor cell 42, and correcting an effect of the residual oxygen in the measuring gas chamber. Incidentally, the current flowing to the monitor cell 43 flows by the transfer of oxygen ion in the solid electrolyte 2Z and the current flowing from the monitor cell 43 flows by a transfer of oxygen ion in the solid electrolyte 2Y.

As shown in FIG. 1 to FIG. 3 and FIG. 5, the pump electrode 21 among the pair of electrodes 21 and 25 of the pump cell 41, the sensor electrode 22 among the pair of electrodes 22 and 25 of the sensor cell 42 and the monitor electrode 23 among the pair of electrodes 23 and 25 of the monitor cell 43 are provided on one of the surfaces 201 of the solid electrolyte body 2, as an electrode disposed on the measuring gas chamber 101. The pump electrode 21 is disposed at an upstream side of a flow of the measuring gas G, which is a position near the diffusion resistance body 32. The sensor electrode 22 and the monitor electrode 23 are disposed next to each other in horizontal direction at a downstream side of the flow of the measuring gas G, with respect to the pump electrode 21.

The other electrode 25 of the pump cell 41, the sensor cell 42 and the other electrode 25 of the monitor cell 43 is disposed on the second surface of the solid electrolyte body 2 as an electrode positioned in the reference gas chamber 102. The electrodes 25 are exposed to a reference gas (air) introduced in the reference gas chamber 102. In the first embodiment, a single electrode 25 is provided for an entirety of the pump cell 41, the sensor cell 42 and the monitor cell 43. It is noted that the electrode 25 may be provided as individual electrodes for the cells 41, 42 and 43.

A voltage applied to the pump cell 41 maybe a switchable two S process, whereby a regular voltage V1 (refer to FIG. 1) is applied to the pump cell 41 when detecting a gas concentration of the gas concentration detection apparatus, and the elimination voltage V2 (refer to FIG. 4) is applied at the start-up point of the sensor of the gas concentration detection apparatus.

As shown in FIG. 1, FIG. 2 and FIG. 5, the sensor element 1 has a single layer of plate shaped solid electrolyte body 2, and the solid electrolyte 2X of the pump cell 41, the solid electrolyte 2Y of the sensor cell 42 and the solid electrolyte 2Z of the monitor cell 43 is each formed as a part of the same solid electrolyte body 2.

The measuring gas chamber 101 of the sensor element 1 is composed of the pump electrode 21 of the pump cell 41, the sensor electrode 22 of the sensor cell 42 and the monitor electrode 23 of the monitor cell 43 provided in one chamber, for example, without a partition.

Since partitioning walls, for example, are not formed in the measuring gas chamber 101, an area of a cross section of a flow route, which is perpendicular to a flow direction of the measuring gas G in the measuring gas chamber 101, is consistent from the upstream side to the downstream side of the flow direction of the measuring gas G. A cross section area of a flow route of a part of the measuring gas chamber 101 in which the pump electrode is disposed, and a cross section area of a flow route of a part of the measuring gas chamber 101 in which the sensor electrode 22 is disposed, are the same. Furthermore, since there are no partitions, for example, formed in the measuring gas chamber 101, hydrogen generated at the start-up point of the sensor can be efficiently supplied to the sensor electrode 22. As a result, oxygen occluded in the sensor electrode 22 can be efficiently removed as a result.

It is noted that the measuring gas chamber 101 may be provided such that, an area of a cross section of a path flow which is perpendicular in the flowing direction of the measuring gas G in the measuring gas chamber 101, is continuously changed. Particularly, the measuring gas chamber 1 may be provided so that an area of the cross section of the flow route is changing continuously with a gradual slope. In this instance also, a similar working effect of rapidly removing the oxygen occluded in the sensor electrode can be obtained.

The regular voltage V1 from the pump cell controller 61 is adjusted so that the oxygen concentration in the measuring gas chamber 101 is lower than a predefined concentration. A range of the regular voltage V1 is between 0.3 to 0.4 V. A current flowing to the pump cell 41 represents a feature of a limiting current whereby the current in the pump cell 41 is almost unchanged, even if the solid electrolyte body 2 changes the voltage applied to the pump cell 41.

The elimination voltage V2 of the pump cell controller 61 is set higher than the regular voltage V1, as a voltage value which is higher than a voltage value representing the limiting voltage. In the first embodiment, the elimination voltage V2 is set within a range of 0.5 to 2 V.

In the sensor cell 42, a predefined voltage which represents the limiting voltage is applied by the sensor cell detection section 62, at the start-up point of the sensor before the detection of the gas concentration is performed and when the gas concentration is detected. In the monitor cell 43, the predefined voltage representing the limiting current is applied by the monitor cell detection section 63.

Figure 6:
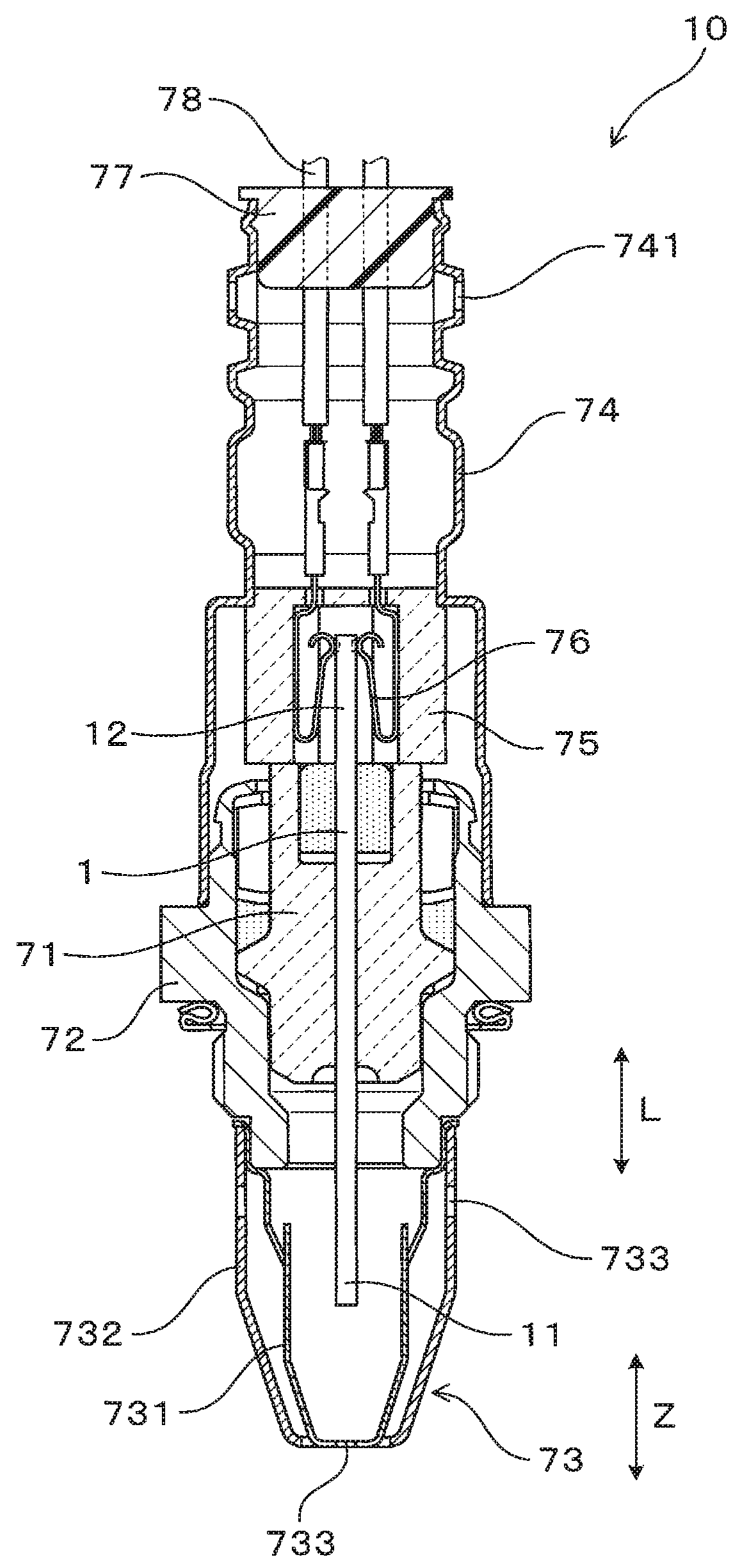
FIG. 6 is a descriptive diagram showing a cross section of a gas sensor of the gas concentration detection apparatus according to the first embodiment.

As shown in FIG. 6, the gas sensor 10 according to the embodiment is provided with the sensor element 1 formed as a long formation. A longitudinal direction L of the sensor element 1 is parallel with an axial direction Z of the gas sensor 10. The pump electrode 21, sensor electrode 22, monitor electrode 23 and the electrode 25 are disposed on a front end section 11 of the sensor element 1 in the longitudinal direction L. The front end section 11 is projected from the housing 72 and exposed to the measuring gas G. A lead part connecting each of the electrodes 21, 22, 23 and 25 and a lead section connecting a conduction layer 52 of the heater 5 is disposed at a base end section 12 of the sensor element 1, in the longitudinal direction.

The gas sensor 10 in the embodiment is provided with a front end side insulator 71 retaining the sensor element 1, a housing 72 retaining the front end side insulator 71, a front end side cover 73 provided at the front end side of the housing 72, and a base end side cover 74 provided at a base end-side of the housing 72. The front end-side of the cover 73 is made from an inside cover 731 and an outside cover 732 disposed on an outside of the inside cover 731. The front end section 11 of the sensor element 1 is covered by the inside cover 731 and the outside cover 732, and an introduction hole 733 for introducing the measuring gas G is formed on the inside cover 731 and the outside cover 732.

The base end-side insulator 75 is disposed to overlap the base end-side of the front end-side insulator 71, at a position of a spring terminal 76. The spring terminal 76 connected to a lead 78 is in contact with each lead section of the base end section 12 of sensor element 1. An introduction hole 741 is formed on a base end-side cover 74, to introduce the reference gas (air) inside the reference gas chamber 102 (duct) of the sensor element 1 of the gas sensor 10. Additionally, a rubber bush 77 retaining the lead 78 is held in the base end-side cover 74.

In the present embodiment, at the start-up point of the sensor before the gas concentration is detected, a controlling range of the temperature of the pump cell 41, sensor cell 42 and the monitor cell 43 is the same as a temperature range set when the gas concentration is detected. Temperature control of the sensor element 1 uses a change of impedance of the pump cell 41 which changes with temperature. A heat quantity of the heater 5 can be adjusted so that the impedance is a predefined value.

The pump cell controller 61 is configured so that at the start-up point of the sensor before the gas concentration is detected, the regular voltage V1 is applied to the pump cell 41 when the gas concentration is detected after the elimination voltage V2 is applied to the pump cell 41 for a predefined time.

As shown in FIG. 1 and FIG. 2, oxygen in the measuring gas G is decomposed by the regular voltage V1, whereas water in the measuring gas G is not decomposed in the pump cell 41 when the gas concentration is detected. In contrast, as shown in FIG. 4, not only oxygen but also the water in the measuring gas is decomposed in the pump cell 41 by the elimination voltage V2 at the start-up point of the sensor. The hydrogen generated by the decomposition of the water removes the oxygen occluded in the sensor electrode 22.

A lower limit value of a predefined time of applying the elimination voltage V2 to the pair of electrodes 21 and 25 of the pump cell 41 may be set as a time needed for a temperature of the solid electrolyte body 2 to become a predetermined activation temperature, from when heating of the solid electrolyte body 2 is initiated by the heater 5. The lower limit value of the predefined time may be set as 5 seconds, for example. If the lower limit value of the predefined time is less than 5 seconds, decomposition of the water in the measuring gas is inadequate, and the oxygen occluded in the sensor electrode 22 may not be sufficiently removed. The lower limit value of the predefined time for applying the elimination voltage V2 may be set longer than 5 seconds so that the solid electrolyte body 2 reaches the activation temperature with higher certainty, for example, the time may be set at 10 seconds.

An upper limit value of the predefined time for applying the elimination voltage V2 may be set as a time in which a preparation time is secured until the detection of the gas concentration is initiated. The upper limit value of the predefined time is preferably set at 30 seconds for example. If the upper limit value of the predefined time exceeds 30 seconds, the preparation time until the gas concentration is detected is longer, the initiation of gas detection is also delayed and there is a possibility of the gas concentration detection apparatus not being sufficiently responsive to control computer. The upper limit value of the predetermined time in which the elimination voltage V2 is applied may be set to a time shorter than 30 seconds as long as an amount of hydrogen needed to remove the oxygen occluded in the sensor electrode 22 is generated accordingly in that time. Furthermore, the time may even be set to less than 20 seconds, as long as the hydrogen amount needed to remove the oxygen occluded in the sensor electrode 22 can be generated.

When a sufficiently long preparation time can be secured until detection of the gas concentration is initiated, the upper limit predefined time of applying the elimination voltage may also be set to 30 seconds.

The sensor electrode 22 is formed from rhodium (Rh) combined with platinum (Pt) material, to provide a decomposition efficiency of NOx. The oxygen occluded in the sensor electrode 22 is oxygen which is occluded in the rhodium of the sensor electrode 22. The oxygen is occluded in the rhodium mainly when the internal combustion engine has been stopped and the gas concentration detection apparatus is not operating. More specifically, residual oxygen in the measuring gas chamber 101 is occluded in the sensor electrode 22, when an applied voltage to the sensor electrode 22 of the senor cell detection section 62 is stopped, whereby the sensor electrode has been heated to the activation temperature to for the detection of the gas concentration.

The pump cell controller 61 is configured to remove the oxygen occluded in the rhodium of the sensor electrode 22 using hydrogen which is generated when water in the measuring gas G is decomposed, at the start-up point before the detection of the gas concentration.

Electrodes other than the sensor electrode 22, that is, the pump electrodes 21 and 25, the monitor electrode 23 and the electrode 25 are formed from gold (Au) combined with platinum material.

In the gas sensor apparatus according to the first embodiment, at the start-up point of the sensor before the detection of the gas concentration, the pump cell controller 61 applies the elimination voltage V2 which is higher than the regular voltage V1 to the pump cell 41, the water in the measuring gas G of the measuring gas chamber 101 is decomposed, and hydrogen is generated in the measuring gas chamber 101. Additionally, the hydrogen generated in the measuring is gas chamber 101 spreads inside the measuring gas chamber and flows to the sensor cell electrode 22 of the sensor cell 42. As a result, the hydrogen reacts with the oxygen occluded in the rhodium of the sensor electrode to produce water, and the oxygen is then removed from the rhodium of the sensor electrode 22.

In this way, the gas concentration detection apparatus in the first embodiment, employs a method of supplying hydrogen to the sensor electrode for the reduction of the oxygen occluded in the rhodium of the sensor electrode 22. The oxygen occluded in the sensor electrode 22 can be thus removed by using an oxygen reduction reaction, without forcibly decomposing oxygen by a current flowing to the sensor electrode 22. It is noted that the oxygen occluded in the sensor electrode 22 reacts with hydrogen to become for example, water.

The gas concentration detection apparatus in the present embodiment can thus swiftly remove the oxygen which is occluded in the rhodium of the sensor electrode 22, and strive for an early activation of the gas concentration detection apparatus.

Furthermore, since hydrogen is generated by the pump cell 41, the generated hydrogen can be efficiently supplied to the sensor electrode 22, and the oxygen which is occluded in the rhodium of the sensor electrode 22 can also be swiftly removed. Since hydrogen is generated by the pump cell 41, a sufficient amount of hydrogen can thus be generated for removing the oxygen occluded in the rhodium of the sensor electrode 22.

In the first embodiment, the reference gas chamber 102, into which the reference gas (air) A in the sensor element 1 is introduced, is provided, and the electrode 25 of the pump cell 41, sensor cell 42 and the monitor cell 43 is disposed on the reference gas chamber 102. By providing the sensor element 1 with the reference gas chamber 102 in which air is introduced, especially oxygen ions can be actively transferred to the sensor electrode 22 via the electrode 25.

Hydrogen generated in the measuring gas chamber 101 by decomposing water in the measuring G is ideally completely used in the reduction reaction of the oxygen occluded in the sensor electrode 22. However, controlling the amount of hydrogen generated is not easy. That is, an excess amount of hydrogen may be generated in order to reduce almost all the oxygen occluded in the sensor electrode. In such a case, the excess hydrogen can be eliminated (returned to water) by a reaction with the oxygen ions transferred from the electrode 25 to the sensor electrode 22.

Figure 7:
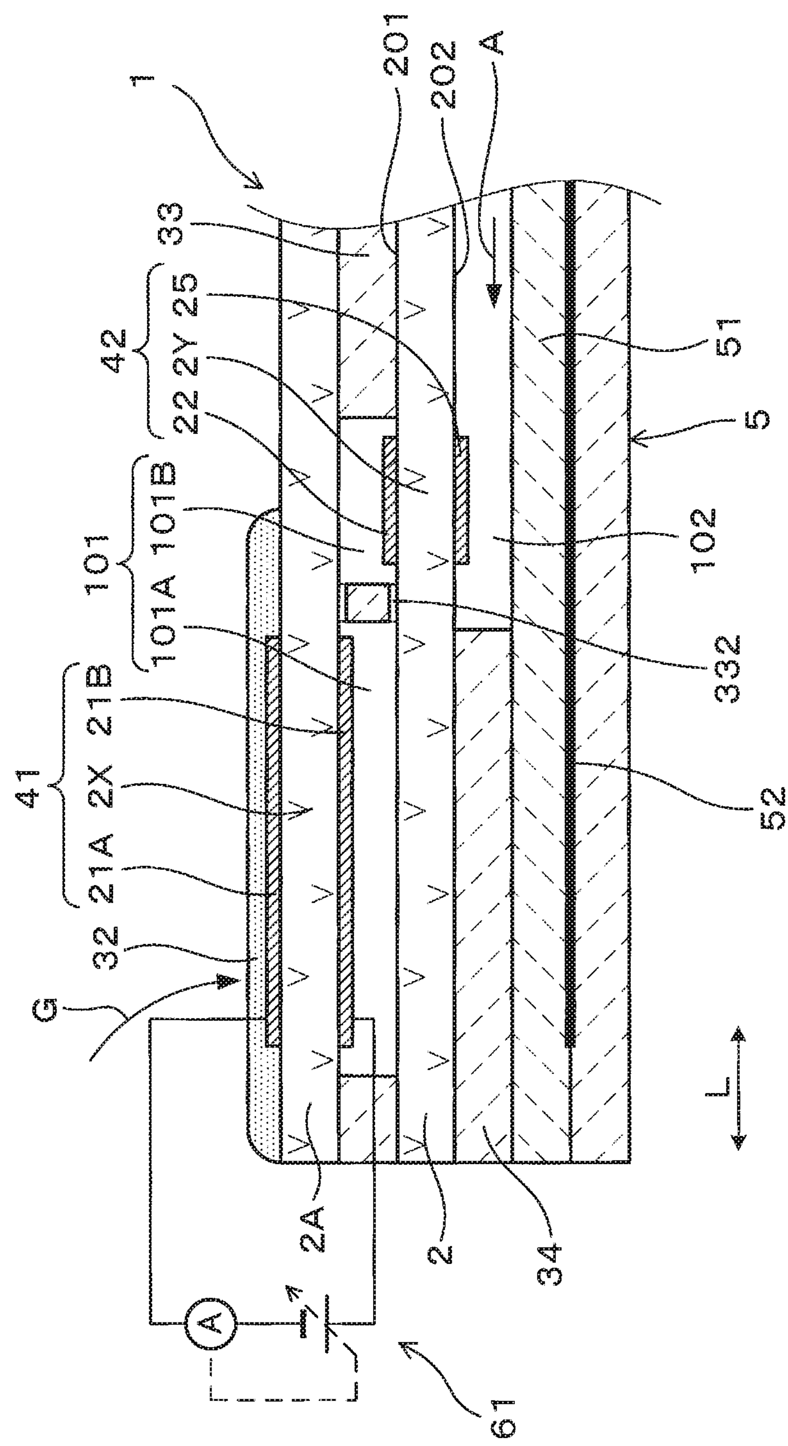
FIG. 7 is a descriptive diagram showing a cross section of a sensor element of another gas concentration detection apparatus according to the first embodiment.

In the first embodiment, the pump electrode 21, the sensor electrode 22, the monitor electrode formed for one layer of the solid electrolyte body 2 has been described. As shown in FIG. 7, other than the mode described above, 2 layers of solid electrolyte body which are a solid electrode body 2 and 2A respectively, can be used. Specifically, a pair of pump electrodes 21A and 21B can be formed on a further solid electrolyte body 2A which is a second solid electrolyte body relative to the electrolyte body 2. In this case, one of the pump electrodes 21A is disposed on an outer part of the measuring gas chamber 101, and another pump electrode 21B is disposed inside the measuring gas chamber 101. The diffusion resistance member 32 is provided on a surface of the other solid electrolyte body 2A.

The configuration of the sensor cell 42 and the monitor cell 43 in this case (FIG. 7) is the same as a configuration shown in FIG. 1 and FIG. 2. A diffusion control part of a slit 332 that allows penetration of the measuring gas G can be provided between a space 101A in which the pump cell 41 is disposed and a space 101E in which the sensor cell 42 and the monitor cell 43 are disposed in the measuring gas chamber 101. In this case the same operating effect as the gas concentration detection apparatus shown in the first embodiment is obtained.

The configuration of the pump cell controller 61, for example, can also be adapted as a gas concentration detection apparatus without the monitor cell 43. In this case also, the same operating effect as the gas concentration detection apparatus shown in the first embodiment is obtained.

Second Embodiment

In the second embodiment a control method of the gas concentration detection apparatus by the control computer will be specifically shown.

Figure 8:
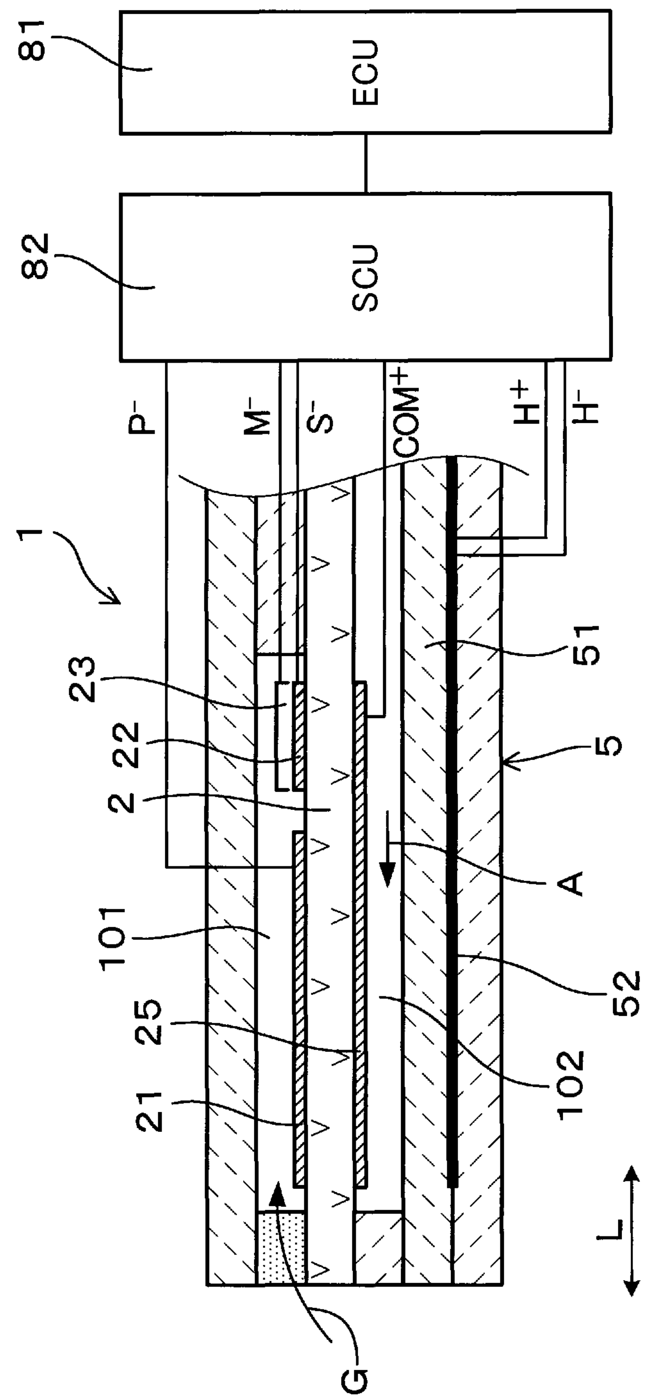
FIG. 8 is a descriptive diagram schematically showing a sensor element and a control computer of a gas concentration detection apparatus according to a second embodiment.

As shown in FIG. 8, the control computer of the gas concentration detection apparatus is provided with an engine control unit (ECU) 81 which controls an entire internal combustion engine of a host vehicle, for example, and a sensor control unit (SCU) 82 which controls an entire gas concentration detection apparatus. Electricity is run in the conduction layer 52 of the heater 5 by the heater controller 64. The pump cell controller 61, sensor cell detection section 62, monitor cell detection section 63 and the heater controller 64 are formed in the SCU 82.

Figure 9:
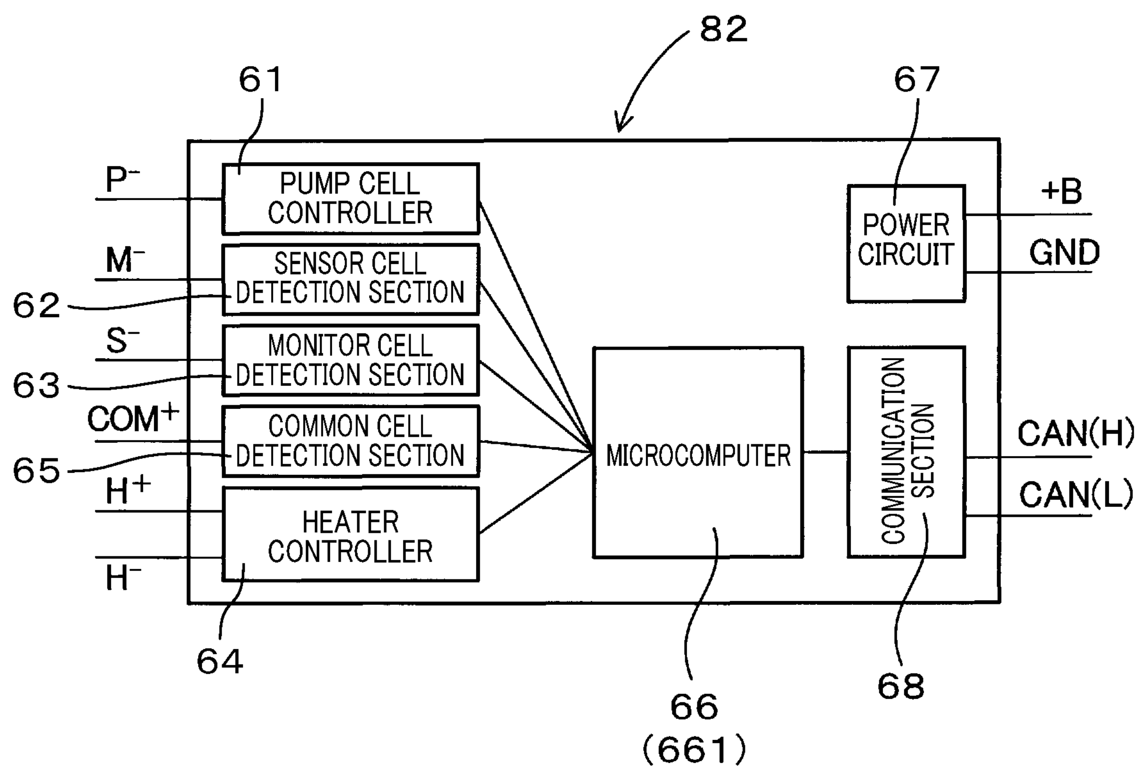
FIG. 9 is a descriptive diagram schematic showing a sensor control unit of the control computer according to the second embodiment.

As shown in FIG. 9, either a part of or an entire SCU 82 is implemented as an analogue circuit or as a digital processor provided with a memory. In either case, a functional control block is provided in the SCU 82 to provide an output function for a control signal, based on a received electric signal.

Functional configuring elements of the SCU 82 will now be described. In addition to the pump cell controller 61, sensor cell 62, monitor cell detection section 63 and the heater control section 64, the SCU 82 is provided with a common cell detection section 65, a microcomputer 66, a power circuit 67 and a CAN (controller area network) communication section 68

The pump cell controller 61 controls the applied voltage to the pump cell 41 and also detects a current output by the pump cell 41. The pump cell controller 61 outputs a signal showing a detected current to a microcomputer. The sensor cell detection section 62 is a section which detects a current output from the sensor cell 42. The sensor cell detection section 62 outputs a signal to the microcomputer showing a detected current. The monitor cell detection section 63 is a section which detects a current output from the monitor cell 43. The monitor cell detection section 63 outputs a signal showing a detected current to the microcomputer. The heater controller 64 controls a voltage applied to the conduction layer 52 of the heater 5 and also controls heat generated at the heater 5.

The common cell detection section 65 is a section which detects a current output from the electrode 25 which is exposed to air as the reference gas A. The common cell detection section 65 outputs a signal showing a detected current to the microcomputer 66. The microcomputer 66 is a control section inside the SCU 82. The microcomputer 66 outputs a control signal for controlling a temperature of the heater 5 of the heater controller 64.

The microcomputer 66 is a section which calculates a NOx concentration in the exhaust gas of the measuring gas G, based on a current detected by the sensor cell section 62 and a current detected by the monitor cell 63. The microcomputer 66 removes a current of the residual oxygen concentration of the exhaust gas detected by the sensor cell 42, to calculate the NOx concentration in the exhaust gas by subtracting an output current of the monitor cell 43 from an output current from the sensor cell 42. The microcomputer 66 outputs a signal representing the calculated NOx concentration to the CAN communication section 68. The power circuit 67 is a power circuit in the SCU 82. The CAN communication section 68 transmits a signal output by the microcomputer 66 to a CAN bus (controller area network bus), and outputs a signal received from the CAN bus to the microcomputer 66.

Figure 10:
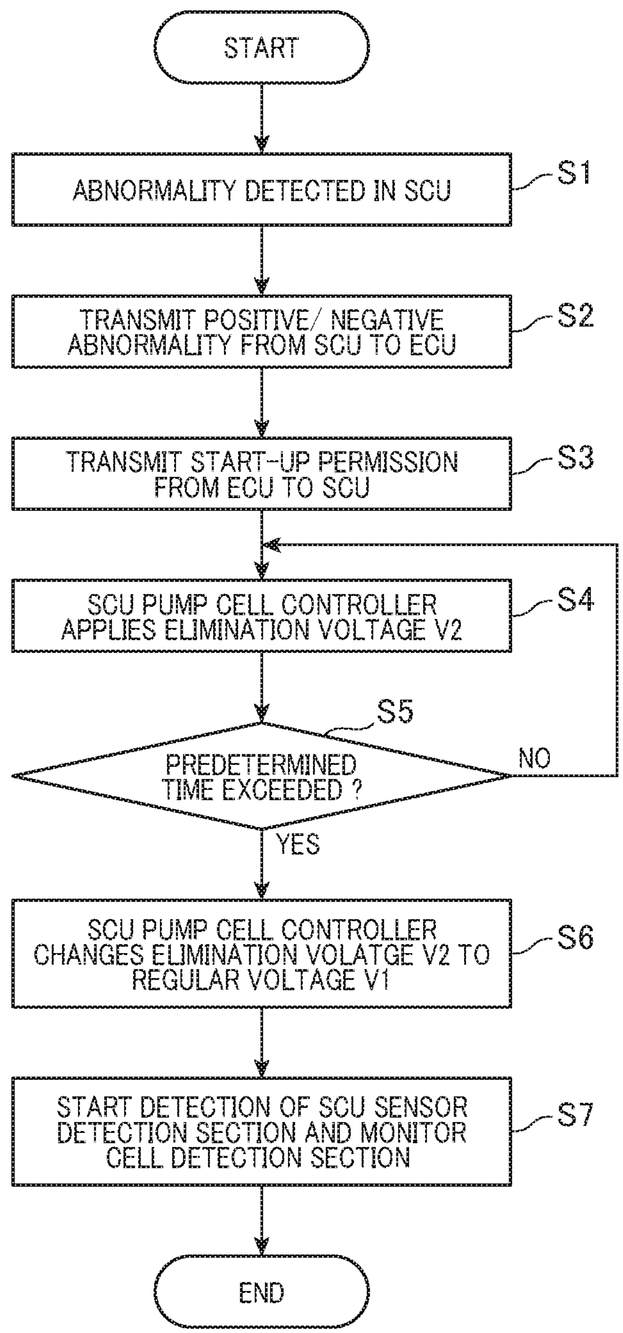
FIG. 10 is a flowchart showing a control method of the gas concentration detection apparatus of the control computer according to the second embodiment.

In controlling the gas concentration detection apparatus by the control computer, as shown in the flow chart in FIG. 10, the SCU 82 confirms whether or not abnormality has occurred in the electrical system in the pump cell 41, the sensor cell 42, the monitor cell 43 and the heater 5 of the gas concentration detection apparatus (S1). Next, a signal of whether or not an abnormality has occurred in the gas is detection concentration apparatus is transmitted from the SCU 82 to the ECU 81 (S2). When the ECU 81 receives a signal from the SCU 82 indicating that an abnormality has not occurred (NEGATIVE) in the gas concentration detection apparatus, a signal permitting a start-up of the SCU 82 is transmitted to the SCU and the SCU 82 is started (S3).

When the sensor is started up by the SCU 82, the SCU 82 initiates a supply of electricity in the conduction layer of the heater 5 by the heater controller 64, and applies the elimination voltage V2 to the pair of electrodes 21 and 25 of the pump cell 41 by the pump cell controller 61 (S4). The control of the heater 5 by the heater controller 64 will be described later in the specifications. The SCU 82 performs a count by a time counter and continues to apply the removal voltage V2 of the pump cell controller 61 until a predefined time is met (S5). The water in the measuring gas (exhaust gas) G which comes into contact with the electrode 21 of the pump cell 41 is then decomposed and generates hydrogen. The hydrogen and oxygen which is occluded in the sensor electrode 22 react and the oxygen is removed from the sensor electrode 22.

Subsequently, the SCU 82 resets the time counter and changes the voltage applied to the pair of electrodes 21 and 25 from the elimination voltage V2 to the regular voltage V1 (S6). The SCU 82 applies a predetermined voltage from the sensor cell detection section 62 to the sensor cell 42, and also applies the predetermined voltage from the monitor detection cell 63 to the monitor cell 43 (S7).

In this way, after the oxygen occluded in the sensor electrode 22 is removed, the NOx concentration is detected at a point of detecting the gas concentration by control of the pump controller 61, the sensor cell detection section 62 and the monitor cell detection section 63.

Figure 11:
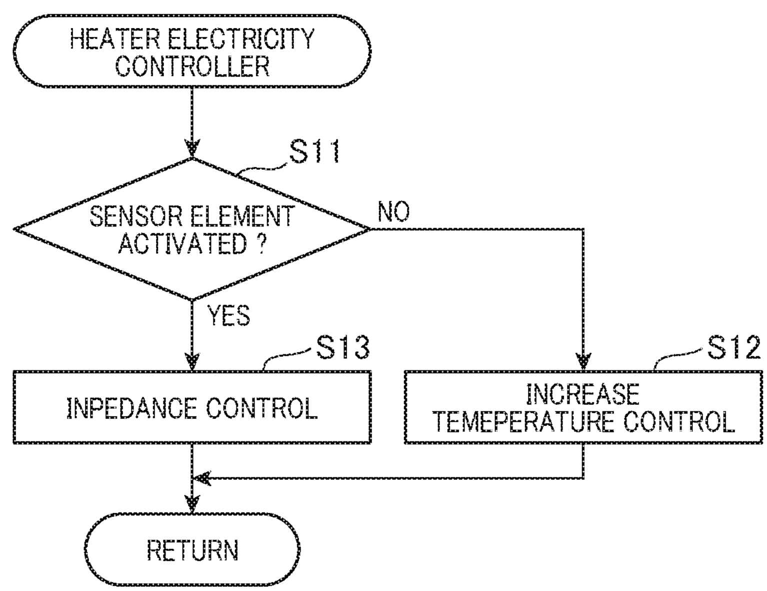
FIG. 11 is a flowchart showing a control method of the sensor control unit the control computer according to the second embodiment.

A content of a process of a heater electricity control routine performed by the SCU 82 is described with reference the flow chart in FIG. 11.

As shown in the same figure, once the routine of the heater electricity control is started, firstly it is determined whether the sensor element 1 has been activated (that is, whether the activation temperature of the sensor element 1 has reached the activation temperature) by determining whether the impedance of the pump cell 41 is below an impedance which indicates activation of the sensor element 1 (S11). The impedance which determines whether the sensor element 1 is activated is referred to as 'activation impedance' herein after. The activation impedance is set to a value which is equivalent to the activation temperature of the sensor element 1.

When determined that the impedance of the pump cell 41 is larger than the activation impedance and the sensor element 1 is not activated, an increased temperature control is performed (S12). For the increased temperature control, an electric duty of the heater 5 is set to an electric duty (for example, 100%) for increasing the temperature, and the sensor element 1 is heated.

In contrast, when the impedance of the pump cell 41 is below the activation impedance and it is determined that the sensor element 1 is activated, an impedance control is initiated (S13). To control the impedance, the heater 5 electric duty is feed-back controlled to converge the impedance of the sensor element 1 to a target impedance. Specifically, to decrease a deviation of impedance between the sensor element 1 and the target impedance, the electric duty of the heater 5 is calculated from the PI control (proportional integral control), for example.

In the second embodiment, symbols, for example, in other configurations of the gas concentration detection apparatus and in the figures are the same as the first embodiment. Furthermore, the same operational effect as the first embodiment are also obtained in the second embodiment.

Experiment 1

In experiment 1, at the start-up point of the sensor before the gas concentration is detected, a function of removing oxygen occluded in the rhodium in the sensor electrode 22 was confirmed by using the hydrogen generated from the pump electrode 21 (samples A1, A2 and A3). As a comparative example, the function of removing oxygen which is occluded in the rhodium of the sensor electrode 22 by the voltage applied to the sensor cell 42 was also confirmed (comparative sample B1).

In the first experiment, at the start-up point of the sensor before the gas concentration is detected, a change in the output current of the sensor cell 42 was measured in a state where NOx was not included in air introduced into the measuring gas chamber.

Figure 12:
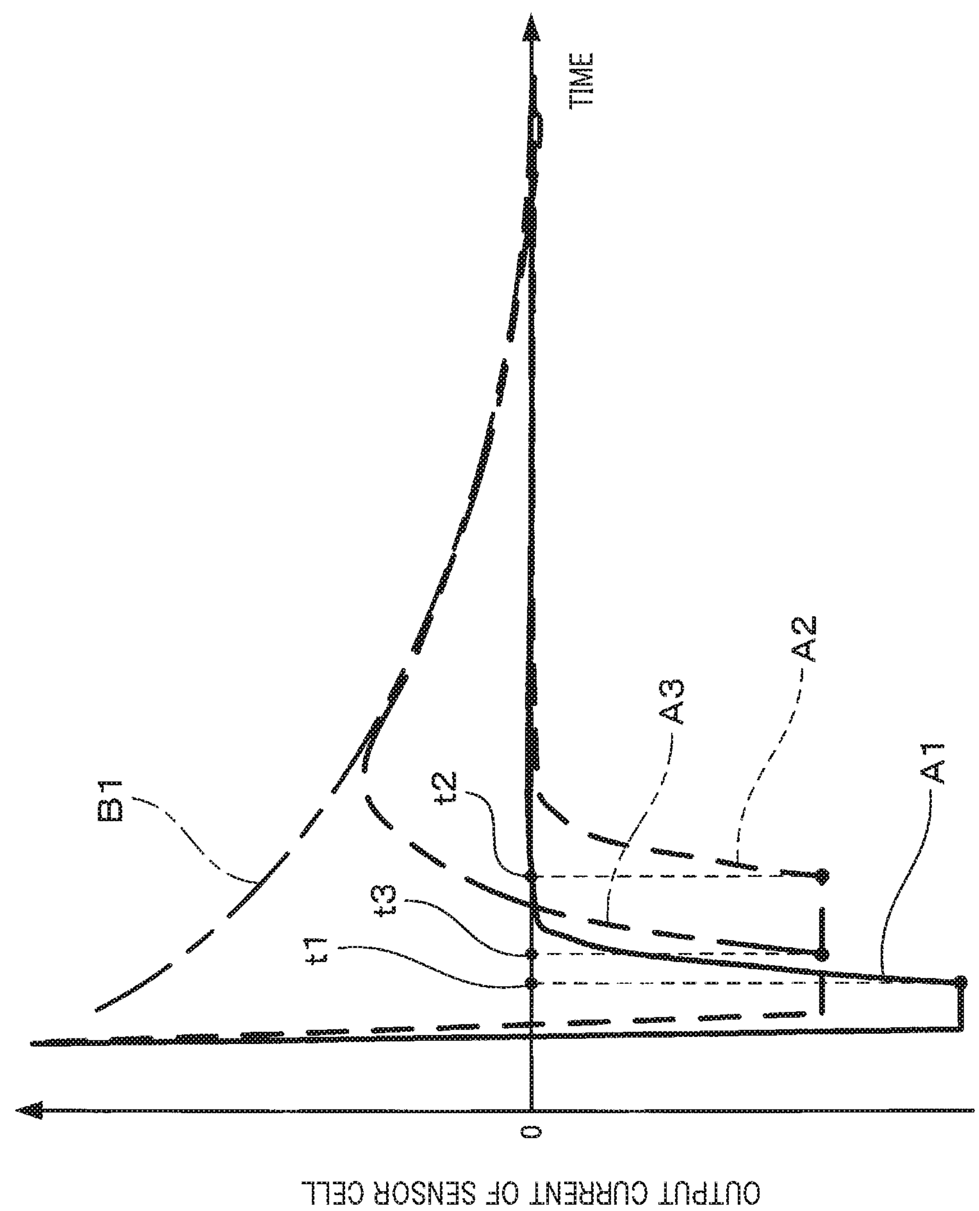
FIG. 12 is graph showing a change in a waveform of an output current until the output current has converged to almost zero at a start-up point of the sensor of the gas concentration apparatus, in which a horizontal axis represents time and a vertical axis represents an output current of a sensor cell in an experiment 1.

FIG. 12, is a waveform showing a change of the output current until the output current converges to zero, at the start-up point of the sensor before the gas concentration is detected. In the graph, a horizontal axis is time and a vertical axis is the output current of the sensor cell 42.

With reference to the comparative sample B1, a long time period is needed until the output current of the sensor cell 42 reaches almost zero. In this case, a convergence time until the oxygen is removed was longer, as the oxygen occluded in the rhodium of the sensor electrode 22 was decomposed by the regular voltage applied to the sensor cell 42.

The convergence time until the oxygen was removed was also measured in the samples A1, A2 and A3. The measurement was performed when; the elimination voltage applied to the pump cell 41 was high and an applied time t1 was short (sample A1), the elimination voltage was low and an applied time t2 was long (sample A2), and also in a case where the elimination voltage was low and an applied time t3 was short (sample A3). In FIG. 12, t1, t2 and t3 represent a time until the elimination voltage was applied for samples A1, A2 and A3 respectively. With reference to waveforms of the samples A1, A2 and A3, a point in which the voltage applied to the pump cell 41 was changed from the elimination voltage to the regular voltage is shown as a black dot in FIG. 12.

It was found that the output current of the sensor cell 42 was greatly changed from a large peaked on a positive side of the output current of the sensor cell to a negative side thereof, immediately after the gas concentration detection was initiated, in samples A1, A2 and A3. It was considered that the change to the negative side of the output current of the sensor cell 42 was due to supplied hydrogen from the pump electrode 21 to the sensor electrode 22.

Also in sample A1, the output current of the sensor cell 42 swiftly is converged to zero even if an applied time t1 of the elimination voltage is short, since the elimination voltage was high. In the sample A2, the output current of the sensor cell 42 converged to zero over a short amount of time even when the elimination voltage was low due to prolonging the applied time t2 of the elimination voltage. In sample A3 the time taken for the output current of the sensor cell 42 to converge to zero was the same as the comparative sample B1 regardless of the low elimination voltage V2, since the applied time t3 of the elimination voltage was cut short.

From the results, it is preferable to increase the elimination voltage V2. However, if the elimination voltage is too high, the solid electrolyte body 2 may be damaged. The elimination voltage V2 can be fixed in a range of 0.5 to 2 V. In order to shorten a time of removing the oxygen occluded in the sensor electrode 22, it is preferable to set the elimination voltage in a range of 1 to 2 V. Incidentally, if the elimination voltage is less than 0.5 V, an effect of removing the oxygen occluded in the sensor electrode 22 is decreased, and if the elimination voltage V2 exceeds 2 V, the solid electrolyte body 2 may be damaged as a result.

Additionally, it is considered that the higher a temperature of the pump cell 41, the easier the decomposition of the water is in the measuring gas G. In this regard, if the temperature of the pump cell 41 is too high, the current output may deteriorate due to aggregation of the pump electrodes 21 and 25. The temperature of the pump cell 41 can thus be in the usual temperature range, in which the gas concentration of the gas concentration detection apparatus is detected (for example, in a range of 700 to 900° C.) at the start-up point of the sensor before the gas concentration is detected. A temperature of the sensor cell 42 and the monitor cell 43 can also be in a range of the usual temperature at the start-up point of the sensor before the gas concentration is detected.

Experiment 2

In experiment 2, other superior effects of the sensor element 1 where confirmed by using the monitor cell 43 together with the sensor cell 42.

In the experiment 2, the output current of the sensor electrode 22 and the output current of the monitor electrode 23 was measured when removing the oxygen occluded in the sensor electrode 22 by using the hydrogen generated from the pump electrode 21, at the start-up-point of the sensor before the gas concentration is detected. In the experiment 2 also, air which did not include NOx was introduced into the measuring gas chamber 101.

Figure 13:
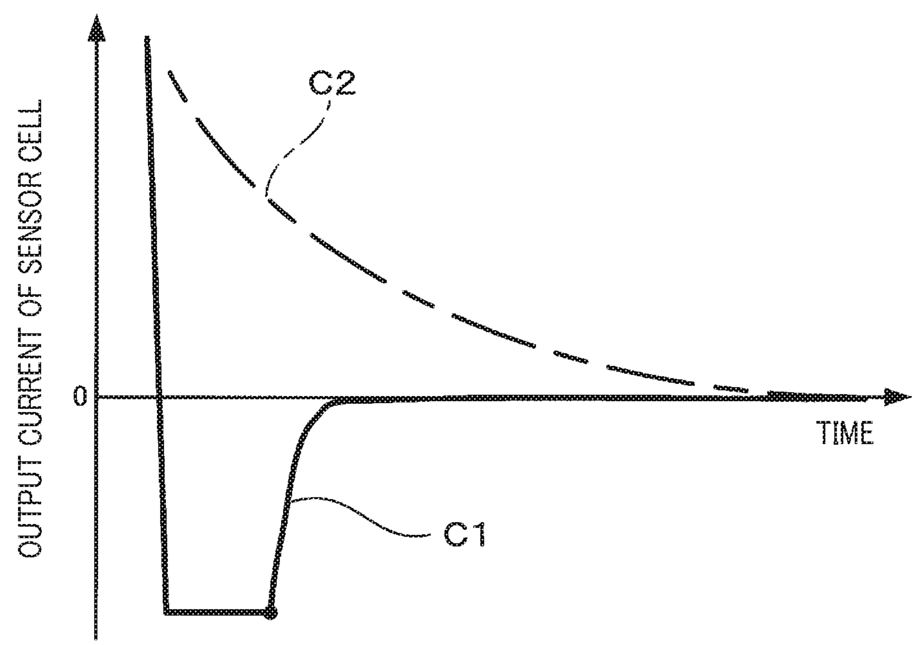
FIG. 13 is a graph showing the change of the waveform of the output current until the output current converges to almost zero, at the start-up point of the sensor of a gas concentration detection apparatus, in which a horizontal axis represents time and a vertical axis represents the output current of the sensor cell in an experiment 2.
Figure 14:
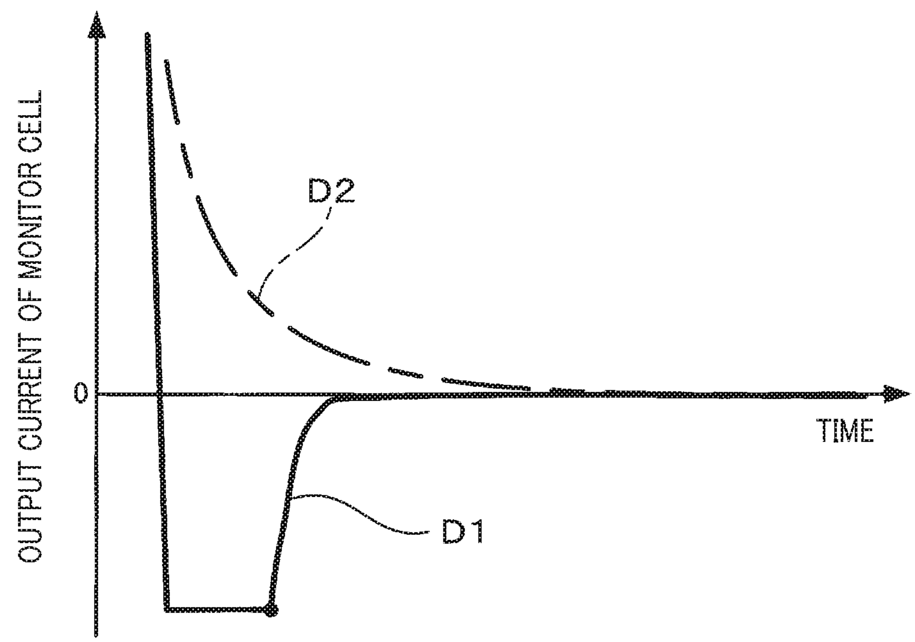
FIG. 14 is a graph showing a change of a waveform of an output current until an output current converges to almost zero, at a start-up point of the sensor of a gas concentration detection apparatus, in which a horizontal axis represents time and a vertical axis represents the output current of a monitor cell in the experiment 2.

In FIG. 13 waveforms C1 and C2 shows the change in the output is current of the sensor cell 42 until the output current converged to almost zero at the start-up point of the sensor. In FIG. 14, waveforms D1 and D2 show a change in the output current of the monitor cell 43 until the output current converged to almost zero, at the start-up point of the sensor. With reference to waveforms C1 and D1, the point at which the voltage applied to the pump cell 41 was changed from the elimination voltage V2 to the regular voltage V1 is shown as a black dot.

In FIG. 13, the removal of oxygen occluded in the rhodium of the sensor electrode 22 by hydrogen generated from the decomposition of the water in the measuring gas, when the elimination voltage V2 is applied to the pump cell 41, is shown as the waveform C1. As a comparative example, the removal of oxygen occluded in the rhodium of the sensor electrode 22, by the voltage applied to the sensor cell 42 is shown as the waveform C2, also shown in FIG. 13. It was found that the waveform C1 of the output current of the sensor cell 42 converged to zero at a shorter time compared with the waveform C2 of the output current of the sensor cell 42.

As shown in FIG. 14, for the monitor cell 43, the change of the output current when the elimination voltage was applied to the pump cell 41 is shown by D1, and as a comparative example, the change of the output current when the elimination voltage was applied to the monitor cell 43 is shown as D2. It was found that, the waveform D1 of the output current of the monitor cell 43 converged to zero at a slightly shorter time, compared with the waveform D2 of the output current of the monitor cell 43. It was also found that the time taken for the waveform D2 of the output current of the monitor cell 43 to converge to zero was shorter than the time taken for the waveform C2 of the output current of the sensor cell 42 to converge to zero, since oxygen was not occluded in the monitor electrode 23 of the monitor cell 43.

Figure 15:
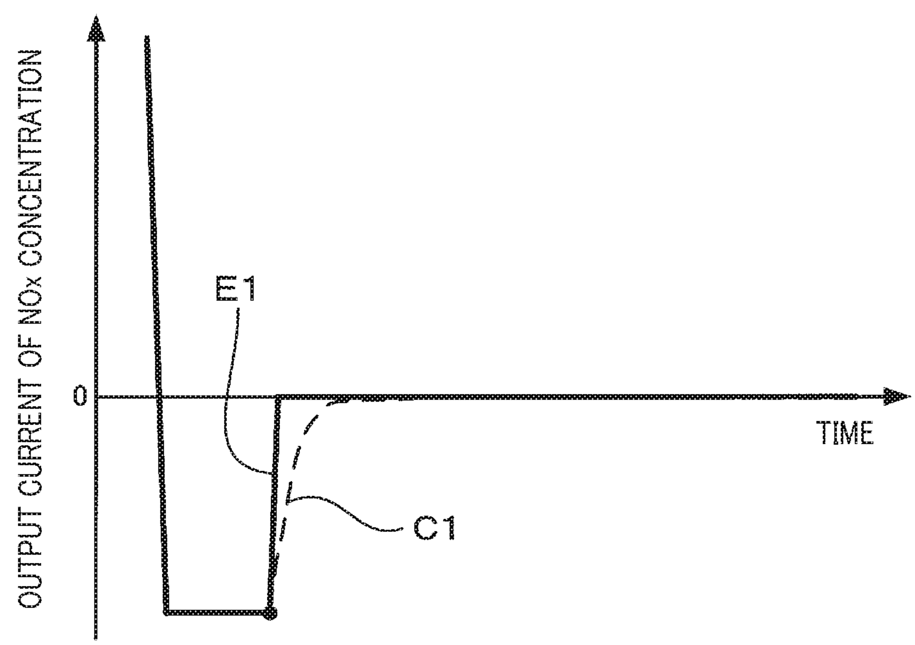
FIG. 15 is a graph showing a changing waveform of an output current until an output current converges to almost zero, at a start-up point of the sensor of a gas concentration detection apparatus, in which a horizontal axis represents time and a vertical axis represents the output current of a monitor cell in the experiment 2.

FIG. 15 shows a comparison of a waveform E1 of an output current when calculating the NOx concentration with the output current of the monitor cell 43 subtracted from the output current of the sensor cell 42, and the wave form C1 of the output current when determining NOx concentration using only the sensor cell 42 (C1 is the same as the waveform C1 of the output current of the sensor cell described above).

As is also shown in FIG. 15, when determining the NOx concentration, the waveform E1 of the output current was equal to a value of the waveform D1 of the output current of the monitor cell 43 subtracted from the waveform C1 of the output current of the sensor cell 42, in a case where the oxygen occluded in the rhodium of the sensor electrode 22 is removed using the hydrogen generated in the pump electrode 21. It was also found that the time until the output current of the waveform E1 was converged to zero was shorter than the time taken for the waveform C1 of the output current to converge to is zero. As a result, by determining the NOx concentration with the sensor cell 42 and the monitor cell 43 combined in the sensor 1, at the start-up point of the sensor, adjustment to zero of the output current showing the NOx concentration can performed promptly and detection of NOx concentration can be swiftly started.

BRIEF DESCRIPTION SYMBOLS

1 sensor element, 101 measuring gas chamber, 2 solid electrolyte body, 21 pump electrode, 22 sensor electrode, 41 pump cell, 42 sensor cell, 61 pump cell controller, 62 sensor cell detection section.

What is claimed is:

1. An apparatus for removing oxygen occluded in a sensor electrode of a gas concentration detection apparatus before detection of a concentration of a specific gas, the gas concentration detection apparatus comprising:

a measuring gas chamber into which a measuring gas is introduced;

a pump cell provided with a first solid electrolyte having oxygen ion conductivity and a first pair of electrodes provided on the first solid electrolyte;

a sensor cell provided with a second solid electrolyte having oxygen ion conductivity and a second pair of electrodes provided on the second solid electrolyte, one electrode of the second pair of electrodes being disposed in the measuring gas chamber as the sensor electrode; and a sensor cell detection section configured to detect the specific gas in the measuring gas of the measuring gas chamber, wherein the sensor cell detection section is configured to detect the concentration of the specific gas in the measuring gas, the apparatus for removing oxygen further comprising:

a pump cell controller programmed to:

apply, for a predetermined time, an elimination voltage only to the pump cell at a start-up point of the gas concentration detection apparatus before detection of the concentration of the specific gas to thereby decompose substances including water in the measuring gas chamber to generate a reduced gas which:

includes hydrogen generated based on the decomposition of the water, and changes a value of an output current of the sensor cell from a positive value above zero to a negative value below zero, thus removing the oxygen occluded in the sensor electrode, the sensor electrode having the occluded oxygen removed therefrom through reaction of the hydrogen with the occluded oxygen; and apply a regular voltage to the pump cell after applying the elimination voltage to the pump cell to thereby adjust an oxygen concentration in the measuring gas of the measuring gas chamber, the elimination voltage being set to be higher than the regular voltage that is applied to the pump cell for detection of the oxygen concentration.

2. The apparatus according to claim 1, wherein the sensor electrode contains platinum and rhodium, and the pump cell controller is programmed to apply the elimination voltage to the pump cell to generate the reduced gas for the removal of the oxygen occluded in the rhodium of the sensor electrode.

3. The apparatus according to claim 2, wherein the elimination voltage is in a range of 0.5 to 2 V.

4. The apparatus according to claim 2, comprising:

a reference gas chamber into which a reference gas is introduced, the reference gas chamber being disposed on an opposing side of a side in which the measuring gas chamber faces the first and second solid electrolytes, wherein there is provided an electrode, among the first pair of electrodes of the pump cell, and an electrode, among the second pair of electrodes of the sensor cell, that are disposed in the reference gas chamber.

5. The apparatus according to claim 2, wherein the first solid electrolyte of the pump cell and the second solid electrolyte of the sensor cell are each formed as a part of a same solid electrolyte body.

6. The apparatus according to claim 2, wherein the measuring gas chamber provides a cross section of a flow path on a part of the pump cell and a cross section of a flow path on a part of the sensor cell, one of the electrodes among the first pair of electrodes being arranged at the part of the pump cell, and the sensor electrode being arranged at the part of the sensor cell, the flow paths on the parts of both the pump cell and the sensor cell being perpendicular to a flow of the measuring gas, and the cross section of the flow path on the part of the pump cell either being the same in area or changing continuously to the cross section of the flow path on the part of the sensor cell.

7. The apparatus according to claim 2, comprising:

a monitor cell provided with a third pair of electrodes disposed on a third solid electrolyte which has oxygen ion conductivity;

a monitor cell detection section configured to detect the oxygen concentration in the measuring gas of the measuring gas chamber, after the oxygen concentration is adjusted by the pump cell, when a voltage is applied to the monitor cell; and a calculation section configured to calculate the concentration of the specific gas in the measuring gas by subtracting an output of the monitor cell detection section from an output of the sensor cell detection section.

8. The apparatus according to claim 1, wherein the elimination voltage is in a range of 0.5 to 2 V.

9. The apparatus according to claim 8, wherein the sensor electrode contains platinum and rhodium, and the pump cell controller eliminates the oxygen which is occluded in the rhodium of the sensor electrode by the reduced gas.

10. The apparatus according to claim 8, comprising:

a reference gas chamber into which a reference gas is introduced, the reference gas chamber being disposed on an opposing side of a side in which the measuring gas chamber faces the first and second solid electrolytes, wherein there is provided an an electrode, among the first pair of electrodes of the pump cell, and an electrode, among the second pair of electrodes of the sensor cell, that are disposed in the reference gas chamber.

11. The apparatus according to claim 8, wherein the measuring gas chamber provides a cross section of a flow path on a part of the pump cell and a cross section of a flow path on a part of the sensor cell, one of the electrodes among the first pair of electrodes being arranged at the part of the pump cell, and the sensor electrode being arranged at the part of the sensor cell, the flow paths on the parts of both the pump cell and the sensor cell being perpendicular to a flow of the measuring gas, and the cross section of the flow path on the part of the pump cell either being the same in area or changing continuously to the cross section of the flow path on the part of the sensor cell.

12. The apparatus according to claim 8, comprising:

a monitor cell provided with a third pair of electrodes disposed on a third solid electrolyte which has oxygen ion conductivity;

a monitor cell detection section configured to detect the oxygen concentration in the measuring gas of the measuring gas chamber, after the oxygen concentration is adjusted by the pump cell, when a voltage is applied to the monitor cell; and a calculation section configured to calculate the concentration of the specific gas in the measuring gas by subtracting an output of the monitor cell detection section from an output of the sensor cell detection section.

13. The apparatus according to claim 1, wherein the predetermined time of the elimination voltage applied to the pump cell is in a range of 5 to 30 seconds.

14. The apparatus according to claim 1, comprising:

a reference gas chamber into which a reference gas is introduced, the reference gas chamber being disposed on an opposing side of a side in which the measuring gas chamber faces the first and second solid electrolytes, wherein there is provided an electrode, among the first pair of electrodes of the pump cell, and an electrode, among the second pair of electrodes of the sensor cell, that are disposed in the reference gas chamber.

15. The apparatus according to claim 1, wherein the measuring gas is an exhaust gas which includes the water discharged from an internal combustion engine, the specific gas in the measuring gas detected by the sensor cell detection section is nitrogen oxide, and the elimination voltage is set to a value so that the hydrogen is generated from the water contained in the measuring gas.

16. The apparatus according to claim 1, wherein the first solid electrolyte of the pump cell and the second solid electrolyte of the sensor cell are each formed as a part of a same solid electrolyte body.

17. The apparatus according to claim 1, wherein the measuring gas chamber provides a cross section of a flow path on a part of the pump cell and a cross section of a flow path on a part of the sensor cell, one of the electrodes among the first pair of electrodes being arranged at the part of the pump cell, and the sensor electrode being arranged at the part of the sensor cell, the flow paths on the parts of both the pump cell and the sensor cell being perpendicular to a flow of the measuring gas, and the cross section of the flow path on the part of the pump cell either being the same in area or changing continuously to the cross section of the flow path on the part of the sensor cell.

18. The apparatus according to claim 1, comprising:

a monitor cell provided with a third pair of electrodes disposed on a third solid electrolyte which has oxygen ion conductivity;

a monitor cell detection section configured to detect the oxygen concentration in the measuring gas of the measuring gas chamber, after the oxygen concentration is adjusted by the pump cell, when a voltage is applied to the monitor cell, and a calculation section configured to calculate the concentration of the specific gas in the measuring gas by subtracting an output of the monitor cell detection section from an output of the sensor cell detection section.

19. A method for removing oxygen occluded in a sensor electrode of a gas concentration detection apparatus before detection of a concentration of a specific gas, the gas concentration detection apparatus comprising:

a measuring gas chamber into which a measuring gas is introduced;

a pump cell provided with a first solid electrolyte having oxygen ion conductivity and a first pair of electrodes provided on the first solid electrolyte; and a sensor cell provided with a second solid electrolyte having oxygen ion conductivity and a second pair of electrodes provided on the second solid electrolyte, one electrode of the second pair of electrodes being disposed in the measuring gas chamber as the sensor electrode;

the method comprising:

detecting the specific gas in the measuring gas of the measuring gas chamber, applying, for a predetermined time, an elimination voltage olylto the pump cell at a start-up point of the gas concentration detection apparatus before detection of the concentration of the specific gas to thereby decompose substances including water in the measuring gas chamber to generate a reduced gas which:

includes hydrogen generated based on the decomposition of the water, changes a value of an output current of the sensor cell from a positive value above zero to a negative value below zero, thus removing the oxygen occluded in the sensor electrode, and the sensor electrode having the occluded oxygen removed therefrom through reaction of the hydrogen with the occluded oxygen;

applying a regular voltage to the pump cell after applying the elimination voltage to the pump cell to thereby adjust an oxygen concentration in the measuring gas of the measuring gas chamber, and detecting the concentration of the specific gas in the measuring gas, the elimination voltage being set to be higher than the regular voltage that is applied to the pump cell for detection of the oxygen concentration.

20. The method according to claim 19, wherein the sensor electrode contains platinum and rhodium, and the method further comprises applying the elimination voltage to the pump cell to generate the reduced gas for the removal of the oxygen occluded in the rhodium of the sensor electrode.

21. The method according to claim 19, wherein the elimination voltage is in a range of 0.5 to 2 V.

22. The method according to claim 19, wherein the predetermined time of the elimination voltage applied to the pump cell is in a range of 5 to 30 seconds.

23. The method according to claim 19, further comprising:

introducing a reference gas into a reference gas chamber, the reference gas chamber being disposed on an opposing side of a side in which the measuring gas chamber faces the first and second solid electrolytes, wherein provided an electrode, among the first pair of electrodes of the pump cell, and an electrode, among the second pair of electrodes of the sensor cell, that are disposed in the reference gas chamber.

24. The method according to claim 19, wherein the measuring gas is an exhaust gas which includes the water discharged from an internal combustion engine, the specific gas in the detected measuring gas is nitrogen oxide, and the elimination voltage is set to a value so that the hydrogen is generated from the water contained in the measuring gas.

25. The method according to claim 19, wherein the first solid electrolyte of the pump cell and the second solid electrolyte of the sensor cell are each formed as a part of a same solid electrolyte body.

26. The method according to claim 19, wherein the measuring gas chamber provides a cross section of a flow path on a part of the pump cell and a cross section of a flow path on a part of the sensor cell, one of the electrodes among the first pair of electrodes being arranged at the part of the pump cell, and the sensor electrode being arranged at the part of the sensor cell, the flow paths on the parts of both the pump cell and the sensor cell being perpendicular to a flow of the measuring gas, and the cross section of the flow path on the part of the pump cell either being the same in area or changing continuously to the cross section of the flow path on the part of the sensor cell.

27. The method according to claim 19, further comprising:

detecting the oxygen concentration in the measuring gas of the measuring gas chamber, after the oxygen concentration is adjusted by the pump cell, when a voltage is applied to a monitor cell provided with a third pair of electrodes disposed on a third solid electrolyte which has oxygen ion conductivity; and calculating the concentration of the specific gas in the measuring gas by subtracting an output of the monitor cell from an output of the sensor cell.

* * * * *